United States Patent
Nallapa et al.

(10) Patent No.: US 8,131,441 B2
(45) Date of Patent: Mar. 6, 2012

(54) SYSTEM AND METHOD FOR CONTROLLING TORQUE BASED ON DRIVER STATUS

(75) Inventors: Venkatapathi Raju Nallapa, West Bloomfield, MI (US); Fazal Urrahman Syed, Canton, MI (US); Ming Lang Kuang, Canton, MI (US); Anthony Mark Phillips, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 12/420,380

(22) Filed: Apr. 8, 2009

(65) Prior Publication Data

US 2010/0262348 A1 Oct. 14, 2010

(51) Int. Cl.
    G06F 7/00 (2006.01)
(52) U.S. Cl. ......................................................... 701/87
(58) Field of Classification Search .................... 701/87; 280/87
    See application file for complete search history.

(56) References Cited

U.S. PATENT DOCUMENTS

| 6,164,403 | A | 12/2000 | Wuidart |
| 7,138,904 | B1 | 11/2006 | Dutu |
| 7,327,242 | B2 | 2/2008 | Holloway et al. |
| 7,765,050 | B2 * | 7/2010 | Hrovat et al. .................. 701/82 |
| 7,769,520 | B2 * | 8/2010 | Ryderstam et al. ............. 701/82 |
| 2005/0171663 | A1 | 8/2005 | Mittelsteadt et al. |
| 2005/0237150 | A1 | 10/2005 | Sun et al. |
| 2006/0066149 | A1 | 3/2006 | Holloway et al. |
| 2006/0155439 | A1 | 7/2006 | Slawinski et al. |
| 2006/0170531 | A1 | 8/2006 | Narayanaswami et al. |
| 2006/0253711 | A1 | 11/2006 | Kallmann |
| 2006/0294393 | A1 | 12/2006 | McCall |

FOREIGN PATENT DOCUMENTS

JP 2006 063 627 A 3/2006

* cited by examiner

*Primary Examiner* — Eric Culbreth
(74) *Attorney, Agent, or Firm* — Frank A. MacKenzie; Brooks Kushman P.C.

(57) ABSTRACT

In at least one embodiment, a device for controlling an amount of torque generated by a powertrain in a vehicle is provided. The controller is configured to receive a driver status signal indicative of the status of the driver, a driver condition signal indicative of the driving conditions of the vehicle, and a driver mode signal indicative of the driving mode of the vehicle. The controller is further configured to control the powertrain to adjust the amount of torque that is generated based on the driver status signal, the driver condition signal, and the driver mode signal.

16 Claims, 3 Drawing Sheets

— Signal ACCEL_TQ_DES
- - - Modified Acceleration Torque as indicated on signal MOD_ACCEL_TQ_DES
— — Final Performance Response as indicated on signal FINAL_MOD_TORQUE_RESP — Signal ACCEL_TQ_DES
- - - Modified Acceleration Torque as indicated on signal MOD_ACCEL_TQ_DES
— — Final Performance Response as indicated on signal FINAL_MOD_TORQUE_RESP

US 8,131,441 B2

SYSTEM AND METHOD FOR CONTROLLING TORQUE BASED ON DRIVER STATUS

BACKGROUND

1. Technical Field

One or more embodiments of the present invention described herein generally relate to a system and method for controlling torque based on driver status.

2. Background Art

Controlling and limiting motor vehicle operation has become a challenge for vehicle drivers, parents, vehicle owners, businesses, and others having an interest in how a motor vehicle is operated. One area of concern is vehicle safety. Individuals often seek new vehicle designs and features to reduce the risk of accidents. In addition, individuals often seek new vehicle designs and features to lower insurance costs and operating expenses. The manner in which elderly drivers, inexperienced drivers, physically challenged drivers, and others having reduced mental capacity operate a vehicle is of special concern. This is a challenge not only for vehicle owners, but also for the general public. Changing how a driver operates a motor vehicle to prevent avoidable accidents and to make vehicle transportation safer is one way to control motor vehicle operation.

Preventing and abating vehicle misuse, abuse, and theft is another area of concern. Vehicles typically are a considerable expense for many individuals and damaged vehicles pose a safety risk to future occupants of the vehicle. Vehicle owners often lend a vehicle to a person with a desire that the vehicle is neither misused, abused, or stolen. The person borrowing the vehicle may be a child, friend, relative, valet driver, assistant driver, or another person entrusted with the owner's vehicle. Similarly, companies seek new ways to prevent undesirable vehicle use by vehicle renters and company employees. Furthermore, individuals and companies would like to minimize fuel, maintenance, and repair costs.

SUMMARY

In at least one embodiment, a device for controlling an amount of torque generated by a powertrain in a vehicle is provided. The controller is configured to receive a driver status signal indicative of the status of the driver, a driver condition signal indicative of the driving conditions of the vehicle, and a driver mode signal indicative of the driving mode of the vehicle. The controller is further configured to control the powertrain to adjust the amount of torque that is generated based on the driver status signal, the driver condition signal, and the driver mode signal.

DETAILED DESCRIPTION

Figure 1:
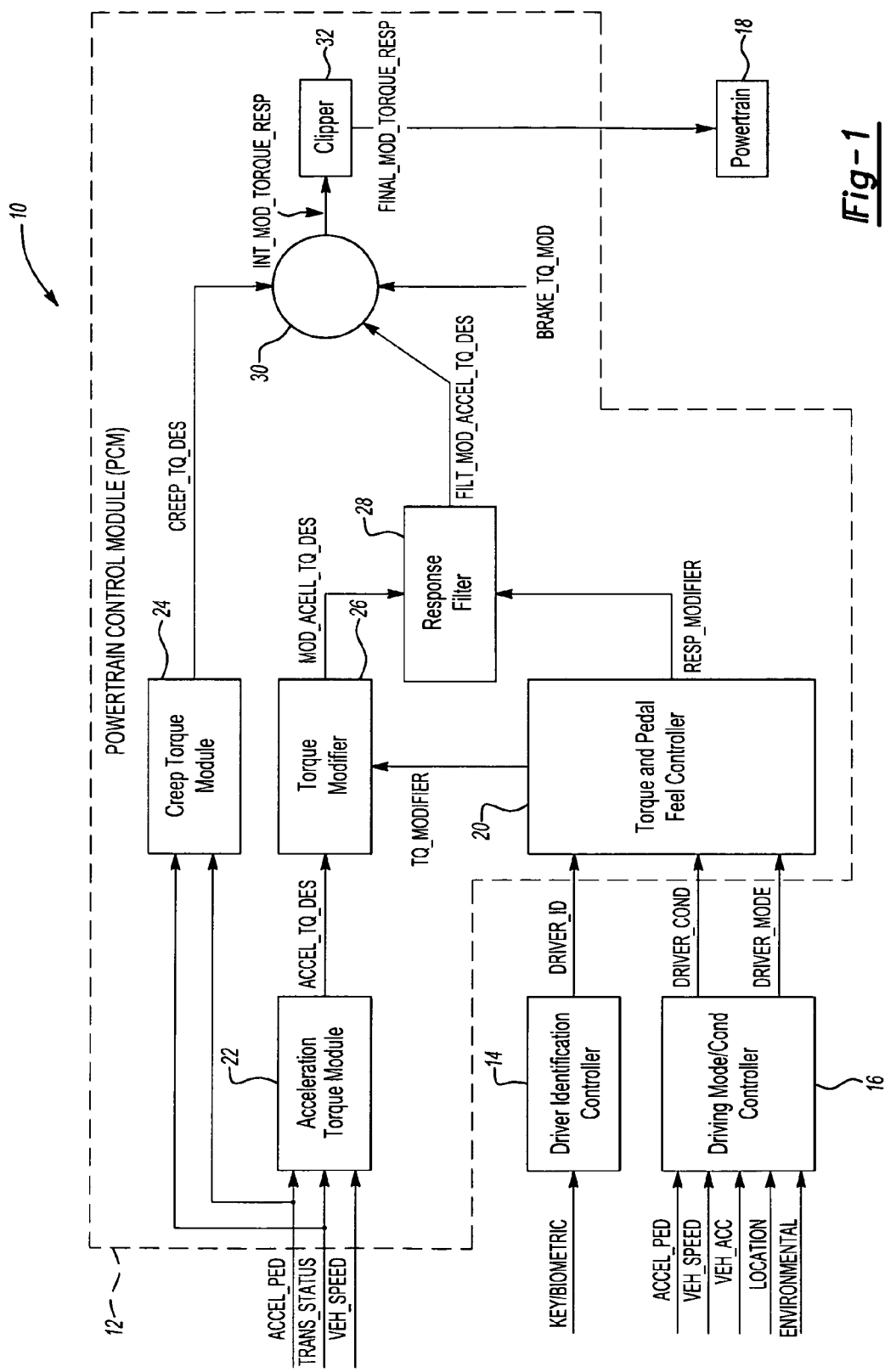
FIG. 1 is a schematic diagram illustrating a system for controlling torque in accordance to one embodiment of the present invention.

The embodiments of the present invention as set forth in FIGS. 1 generally illustrate and describe a plurality of controllers (or modules), or other such electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired or intended to be implemented in the vehicle.

The embodiments of the present invention generally provide, among other things, a system and method for controlling the amount of torque produced by a vehicle and performance response based on the status of the driver. Driver status may include any one of a master driver (e.g., owner of the vehicle), a power driver (e.g., spouse of master driver or close relative), a limited driver (e.g., general friend or relative), a limited driver with assistance needs (e.g., friends and/or relative with disability), a severely limited driver (e.g., teen) or an unknown driver (e.g., a valet). Other characteristics such as, but not limited to, driver conditions (e.g., vehicle over speeding, vehicle speed over a posted limit, vehicle speed over a set maximum threshold, vehicle over accelerations, vehicle over accelerations over a set max threshold, slippery road conditions and cold weather conditions) and driver mode (e.g., luxury mode, city-type driving mode, highway driving mode, all-terrain driving mode) may be used along with driver status to control the amount of torque produced by the vehicle and the performance response of the vehicle.

FIG. 1 depicts a system 10 for controlling torque and performance response based on driver status for a vehicle in accordance with one embodiment of the invention. The system 10 includes a powertrain control module (PCM) 12, a driver identification controller 14, a driving mode/condition controller 16, and a powertrain 18. In general, the driver identification controller 14 determines the status of the driver based on inputs received by at least one of a key and biometric information. In the event the key or biometric information is used as an input to gain entry into the vehicle or to start the vehicle, the driver identification controller generates a signal DRIVER_ID which corresponds to the status of the driver. For example, the signal DRIVER_ID may correspond to the master driver (e.g., owner of the vehicle), the power driver (e.g., spouse of master driver or close relative), the limited driver (e.g., general friend or relative), the limited driver with assistance needs (e.g., friends and/or relative with disability), the severely limited driver (e.g., teen) or an unknown driver (e.g., a valet).

An example of a system that is used to determine driver status or driver identity based on a particular key that is used to gain entry into the vehicle or is used to start the vehicle is disclosed in U.S. patent Ser. No. 12/139,005 entitled "SYSTEM AND METHOD FOR PROGRAMMING KEYS TO A VEHICLE TO ESTABLISH PRIMARY AND SECONDARY DRIVERS", filed on Jun. 13, 2008, which is hereby incorporated by reference in its entirety. Further, U.S. patent Ser. No. 12/139,005 discloses various embodiments for associating various drivers to keys. Such a method and/or system for associating various drivers to keys may be performed by the master driver. While the reference disclosed above generally distinguishes between a primary driver (e.g., master driver) and a secondary driver (e.g., teen), additional identity types, key serial numbers and/or encrypted data may be added to the look up table of the reference disclosed above to account for the additional driver identities disclosed herein (e.g., power driver, limited driver, limited driver with assistance needs, or unknown driver). The method for determining driver status based on biometric information is known in the art and will not be described further.

The driving mode/condition controller 16 is generally configured to determine current driving conditions and modes that the vehicle is exhibiting. For example, the driving mode/condition controller 16 generates a signal DRIVER_COND which corresponds to, but not limited to, whether the vehicle is driving over a posted speed limit, speeding over a max vehicle speed threshold, accelerating over/under a set maximum threshold. The driving mode/condition controller 16 monitors signals ACC_PEDAL, VEH_SPEED, VEH_ACC and ENVIRONMENTAL to generate the signal DRIVER_COND.

The signal DRIVER_COND is generally a value that has a value that is between '0' and '1' (e.g., '0' corresponds to a severe condition and '1' corresponds to a normal condition). The signal DRIVER_COND represents conditions such as, but not limited to, over speeding, speed over a posted limit, speeds over a set maximum threshold (e.g., 70 mph), over accelerations, over accelerations over a set max threshold, slippery road conditions and/or cold weather conditions. The relevance of the signal DRIVER_COND will be discussed in more detail below. The signal ENVIRONMENTAL includes, but is not limited to, ambient temperature, engine coolant temperature, barometric pressure, altitude and/or road grade. Methods for obtaining the items that comprise the signal ENVIRONMENTAL are known in the art and will not be described further.

The driving mode/condition controller 16 generates a signal DRIVER_MODE which corresponds to, but not limited to, whether the vehicle is encountering city-type driving, highway type driving, soft driving, normal driving, and aggressive driving. The signal DRIVER_MOD has a value that is between '0' and '1' (e.g., '0' corresponds to a severe condition and '1' corresponds to a normal condition). The value of the signal DRIVER_MOD represents aggressive, normal, or soft driving styles in the city or on the highway. The relevance of the signal DRIVER_MOD will be discussed in more detail below.

The PCM 12 includes a torque and pedal feel controller 20, an acceleration torque module 22, a creep torque module 24, a torque modifier module 26, a response filter 28, an adder circuit 30, and a clipper block 32. The controller 20, modules 22, 24, 28, and the circuits 30, 32 are generally configured to co-act with one another to generate a signal FINAL_MOD_TORQUE_RESP which corresponds to a final wheel torque and performance response for achieving the final wheel torque. The PCM 12 transmits the signal FINAL_MOD_TORQUE_RESP to the powertrain 18 so that the powertrain 18 generates torque in accordance to a performance response amount based on the signal FINAL_MOD_TORQUE_RESP. The PCM 12 generates the signal FINAL_MOD_TORQUE_RESP based on driver status as indicated on the signal DRIVER_ID, driving conditions of the vehicle based on the signal DRIVER_COND (e.g., over speeding, speeding over posted limits, speeds over a set max threshold, over accelerations, over accelerating over a set max threshold, slippery road conditions, cold weather condition, etc.) and the driving modes of the vehicle based on the signal DRIVER_MODE (e.g., aggressive, normal, or soft driving styles in city or on highway).

The signals DRIVER_ID, DRIVER_COND, and DRIVER_MODE are generally transmitted over a vehicle data bus. The vehicle data bus may be implemented as a High/Medium Speed Controller Area Network (CAN) bus, a Local Interconnect Network (LIN), or any such suitable data link communication bus generally situated to facilitate data transfer between the controllers (or modules) in the vehicle. In general, all signals and/or outputs disclosed herein are capable of being transmitted on the vehicle data bus.

The desired amount of accelerator torque that is requested by the driver is determined by the acceleration and torque module 22 and represented by a signal ACCEL_TQ_DES. Such a desired amount of accelerator torque does not take into account the values represented on the signals DRIVER_ID, DRIVER_COND, and DRIVER_MODE. The acceleration and torque module 22 generates the signal ACCEL_TQ_DES in response to signals ACCEL_PED, TRAN_STATUS, and VEH_SPEED. The signal ACCEL_PED generally corresponds to the desired acceleration of the vehicle based on the position of the acceleration pedal. The signals ACCEL_PED, TRANS_STATUS and VEH_SPEED may be determined by additional circuitry in the PCM 12 (not shown) or by another suitable controller in the vehicle. The signal TRANS_STATUS generally corresponds to the position of the transmission (e.g., Park, Neutral, Reverse, and Drive), the transmission gear ratio, and torque converter capability. The signal VEH_SPEED corresponds to the current speed of the vehicle.

The acceleration torque module 22 determines the signal ACCEL_TQ_DES based on the accelerator pedal position (e.g., signal ACCEL_PED) for a given vehicle speed (e.g., signal VEH_SPEED), transmission gear ratio and torque converter capability (e.g., signal TRANS_STATUS). The acceleration torque module 22 may also determine the signal ACCEL_TQ_DES based on the calculated accelerator pedal position (e.g., signal ACCEL_PED) for a given engine speed and torque converter capability.

The torque and pedal feel controller 20 is generally configured to generate a signal TQ_MODIFIER and a signal RESP_MODIFIER. The signal TQ_MODIFIER generally corresponds to a compensation value to reduce a desired amount of accelerator torque as requested by the driver (e.g., reduce the signal ACCEL_TQ_DES). For example, the torque modifier module 26 reduces the desired amount of accelerator torque of the vehicle (e.g., as indicated on the signal ACCEL_TQ_DES) based on the value indicated on a signal TQ_MODIFIER to generate a signal MOD_ACCEL_TQ_DES. The signal MOD_ACCEL_TQ_DES corresponds to an adjusted amount of torque (if any such torque on the signal ACCEL_TQ_DES was adjusted) based on the signal TQ_MODIFIER).

The value of the signal TQ_MODIFIER is generally based on the identity of the driver (e.g., whether the driver is the master, power user, limited user w/assistance needs, severely limited user with assistance needs, or unknown user) as indicated on the signal DRIVER_ID, the driving condition of the vehicle as indicated on the signal DRIVER_COND, and the driving mode of the vehicle as indicated on the signal DRIVER_MODE.

In general, the signal TQ_MODIFIER takes into account the driver's identity noted on the signal DRIVER_ID and the values of the signal DRIVER_COND and DRIVER_MOD. For example, if the driver is determined to be the severely limited driver, the signal DRIVER_COND is close to a value of zero (e.g., due to speed over posted limits, slippery road conditions, and/or accelerating over a set max threshold), and the signal DRIVER_MODE is close to a value of zero (e.g., due to aggressive driving in the city or on the highway), then the compensation value of the signal TQ_MODIFIER may be greater (which leads to a greater reduction in the amount of torque desired from the driver) than the compensation value of the signal TQ_MODIFIER for a driver being a power driver assuming the values of the signals DRIVER_COND and DRIVER_MODE are equal between the power driver and the severely limited driver.

In the event the signal DRIVER_ID indicates that the driver is determined to be the master driver, the compensation value on the signal TQ_MODIFIER may be small or zero thereby not affecting or reducing the signal ACCEL_TQ_DES (i.e., the desired amount of torque requested by the driver), regardless of the values of the signal DRIVER_MODE and DRIVER_COND. In the event the signal DRIVER_ID indicates that the driver is determined to be the unknown user, the compensation value may be a large number so that the signal TQ_MODIFIER corresponds to a greater reduction in signal ACCEL_TQ_DES (i.e., the desired amount of torque requested by the driver), regardless of the values of the signal DRIVER_MODE and DRIVER_COND. In the event the signal DRIVER_ID indicates that the driver is determined to be one of the power user, the limited user w/assistance needs, and the severely limited user, the signal TQ_MODIFIER may be any value therebetween to reduce the signal ACCEL_TQ_DES accordingly based on the values of the signals DRIVER_COND and DRIVER_MODE.

The torque and feel controller 20 is also configured to generate a signal RESP_MODIFIER which corresponds to an amount of value that is needed to adjust a desired performance response. Performance response is generally defined as the vehicle acceleration feel that a driver may experience when driving the vehicle. The value of the signal RESP_MODIFIER is based on the signals DRIVER_ID, DRIVER_COND, and DRIVER_MOD. Based on driver status, driver conditions, and driver mode; the signal RESP_MODIFIER may be used to adjust the vehicle acceleration feel experienced by the driver. For example, in the event the signal DRIVER_ID indicates that the driver is determined to be the master driver, the compensation value on the signal RESP_MODIFIER may be small or zero and therefore not affect the overall performance response (regardless of the values of the signal DRIVER_MODE and DRIVER_COND). In the event the signal DRIVER_ID indicates that the driver is determined to be the unknown user, the compensation value may be a large number so that the signal RESP_MODIFIER corresponds to a greater reduction in performance response (regardless of the values of the signal DRIVER_MODE and DRIVER_COND). In the event the signal DRIVER_ID indicates that the driver is determined to be one of the power user, the limited user w/assistance needs, and the severely limited user, the signal RESP_MODIFIER may be any value therebetween and may adjust the performance response of the vehicle by taking into account the signal RESP_MODIFIER takes into account the value of the signal DRIVER_COND and DRIVER_MODIFIER. For example, if the driver is determined to be the severely limited driver and the signal DRIVER_COND is close to a value of zero (e.g., due to speed over posted limits, slippery road conditions, and accelerating over a set max threshold) and the signal DRIVER_MODE is close to a value of zero (e.g., due to aggressive driving in the city or on the highway), then the compensation value of the signal RESP_MODE may be greater than the compensation value of the signal RESP_MODE for a driver being a power driver assuming the values of the signals DRIVER_COND and DRIVER_MODE are equal between the power driver and the severely limited driver.

The response filter 28 is generally configured to receive the signal MOD_ACCEL_TQ_DES and adjust the performance response of the signal MOD_ACCEL_TQ_DES (i.e., adjust the performance rate or any such adjusted torque value indicated on the signal MOD_ACCEL_TQ_DES) based on the value indicated in the signal RESP_MODIFIER. The response filter 28 reduces the overall filter constant for filtering/shaping the signal MOD_ACCEL_TQ_DES to reduce or slow down the performance response (if applicable) based on the value contained within the signal RESP_MODIFIER. The value of the signal RESP_MODIFIER affects the performance response by controlling the response time of the response filter 28. The response filter 28 generates a signal FILT_MOD_ACCEL_TQ_DES which corresponds to the adjusted performance response while achieving the desired torque (or adjusted torque).

The creep torque module 24 is configured to generate a signal CREEP_TQ_DES which corresponds to a desired creep torque amount. The creep torque module 24 generates the signal CREEP_TQ_DES in response to the signals ACCEL_PED and TRANS_STATUS. The signal CREEP_TQ_DES is a calibratible value that depends on a particular vehicle platform and depends on the vehicle speed, transmission gear ratio, and torque converter capability. In the event driver has not depressed the accelerator pedal, the vehicle creeps (or moves at a predetermined speed (e.g., 6 mph)). The system 10 takes the signal CREEP_TQ_DES into account by not controlling (or reducing) the performance response and/or torque generation in the event the signal ACCEL_PED indicates a driver is not depressing the accelerator pedal.

The adder circuit 30 receives the signal CREEP_TQ_DES, the signal FILT_MOD_ACCEL_TQ_DES, and a signal BRAKE_TQ_MOD. The output of the response filter 28 is the signal ACCEL_TQ_DES that is adjusted by the signal RESP_MODIFIER. The signal BRAKE_TQ_MOD is generally implemented on hybrid electric vehicles. The signal BRAKE_TQ_MOD represents a regenerative braking torque value that is provided via a powertrain (not shown) instead of friction brakes when the brake pedal is pressed. The adder circuit 30 generates a signal INT_MOD_TORQUE_RESP in response to the signals CREEP_TQ_DES and BRAKE_TQ_MOD and the outputs of the torque modifier module 26 and the response filter 28. The overall impact of the signals CREEP_TQ_DES and BRAKE_TQ_MOD may or may not affect the adjusted torque value and the performance response while achieving the adjusted torque value.

The clipper block 32 generates the signal FINAL_MOD_TORQUE_RESP in response to the signal INT_MOD_TORQUE_RESP. The clipper block 32 ensures that the torque request that is transmitted to the powertrain 18 on the signal FINAL_MOD_TORQUE_RESP is within an acceptable torque range (i.e., the final torque request would correspond to a torque request that is between the powertrain minimum and maximum torque capability). The clipper block 32 generates the signal FINAL_MOD_TORQUE_RESP so that the powertrain 18 generates torque at one or more wheels and adjusts the performance response while achieving such a torque in accordance to the signal FINAL_MOD_TORQUE_RESP.

Figure 2:
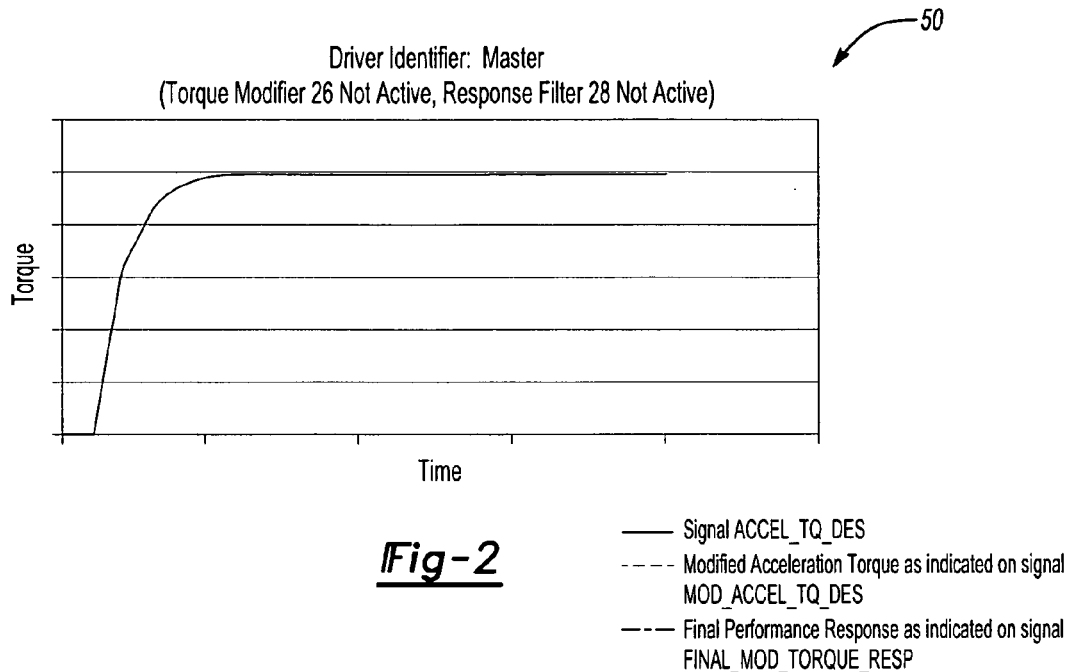
FIG. 2 is a plot illustrating a desired amount accelerator torque, an adjusted amount of accelerator torque and adjusted performance response based on the driver status.

FIG. 2 depicts a plot 50 illustrating a desired amount accelerator torque (e.g., as indicated by the signal ACCEL_TQ_DES), the adjusted accelerator torque (as indicated on the signal MOD_ACCEL_TQ_DES) and the performance response while achieving the adjusted torque value (as indicated on the signal FINAL_MOD_TORQUE_RESP) based on the driver status. The driver status for the plot 50 corresponds to a master driver. As such, there is no reduction to the signal ACCEL_TQ_DES and no change to the final performance response on the signal FINAL_MOD_TORQUE_RESP. Accordingly, it is not needed for the torque modifier 26 to adjust the desired amount of torque and the response filter 28 to adjust performance response.

Figure 3:
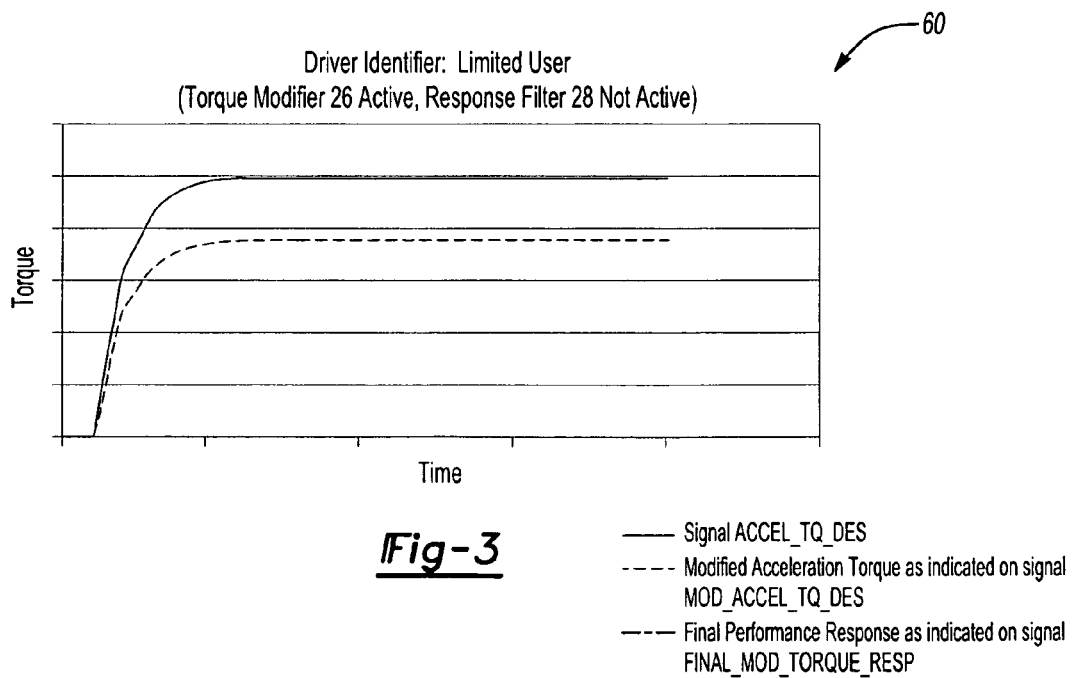
FIG. 3 is a plot illustrating a desired amount accelerator torque, an adjusted amount of accelerator torque and adjusted performance response based on the driver status.

FIG. 3 depicts a plot 60 illustrating a desired amount accelerator torque (e.g., as indicated by the signal ACCEL_TQ_DES), the adjusted accelerator torque (as indicated on the signal MOD_ACCEL_TQ_DES) and the performance response while achieving the adjusted torque value (as indicated on the signal FINAL MOD_TORQUE_RESP) based on the driver status. The driver status for the plot 60 corresponds to a limited driver. The plot 60 illustrates that there is an acceleration torque reduction in response to determining that the driver of the vehicle is the limited driver. There may be no performance response however, in the event the driver of the vehicle is the limited driver. Such a condition is contemplated, as the limited driver is generally a friend or relative of the driver. As such, the intent is to allow the friend or relative of the driver to experience the vehicle's capabilities (e.g., not reducing the performance response to allow the friend or relative to perceive that the vehicle is responding in accordance to the desired amount of torque indicated on the signal ACCEL_TQ_DES) while at the same time ensuring that the vehicle is operating within safe limits (e.g., by reducing the amount of torque). Accordingly, the torque modifier 26 adjusts the desired accelerator torque in response to the amount indicated by the signal TQ_MODIFIER and generates the signal MOD_ACCEL_TQ_DES which indicates a torque reduction. The response filter 28 does nothing in this case to adjust the performance response because it is desired in this case to allow the friend or relative to experience the vehicle's capability.

The torque modifier 26 may further reduce the desired torque (e.g., torque modifier 26 adjust the desired torque (signal ACCEL_TQ_DES) in response to the signal TQ_MODIFIER) in the event the signal DRIVER_COND and DRIVER_MODE indicate such a condition is needed. For example, if the signal DRIVER_COND indicates over speeding (or over speeding over posted limits) and/or slippery road conditions) and the signal DRIVER_MOD indicates aggressive city and/or highway driving mode; the signal TQ_MODIFIER is generated to reflect such a condition. The torque modifier 26 adjusts the signal ACCEL_TQ_DES accordingly so that the amount of accelerator torque on the signal MOD_ACCEL_TQ_DES is reduced more than that illustrated in FIG. 3.

Figure 4:
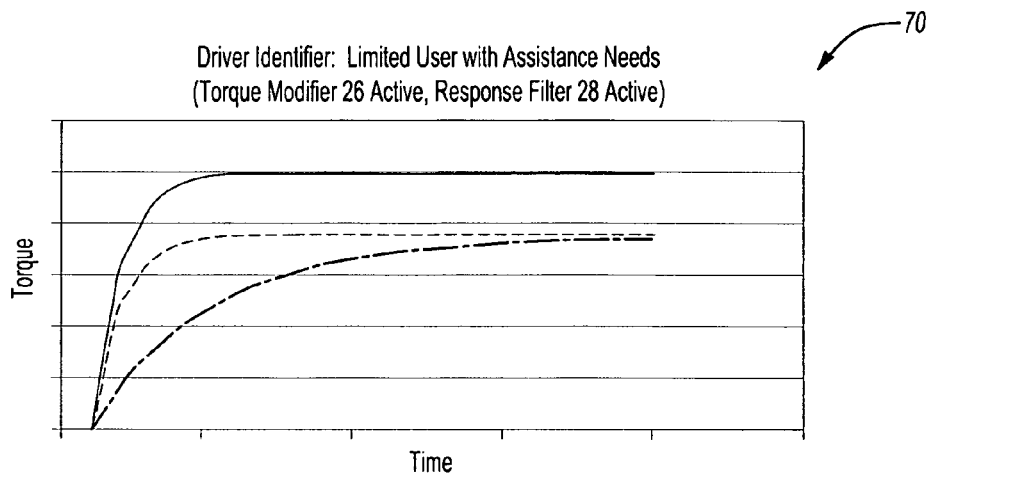
FIG. 4 is a plot illustrating a desired amount accelerator torque, an adjusted amount of accelerator torque and adjusted performance response based on the driver status.

FIG. 4 depicts a plot 70 illustrating a desired amount accelerator torque (e.g., as indicated by the signal ACCEL_TQ_DES), the adjusted accelerator torque (as indicated on the signal MOD_ACCEL_TQ_DES) and the performance response while achieving the adjusted torque value (as indicated on the signal FINAL_MOD_TORQUE_RESP) based on the driver status. The driver status for the plot 70 corresponds to a limited user with assistance needs. The plot 70 illustrates that there is an acceleration torque reduction and a performance response reduction in response to determining that the driver of the vehicle is the limited driver with assistance needs. The plot 70 illustrates that a slower response time may be exhibited in order to achieve the adjusted torque.

The torque modifier 26 may further reduce the desired torque than that shown in FIG. 4 (e.g., torque modifier 26 adjust the desired torque (signal ACCEL_TQ_DES) in response to the signal TQ_MODIFIER), in the event the signals DRIVER_COND and DRIVER_MODE indicate such a condition is needed. Likewise, the response filter 28 may further reduce the desired response time for achieving the adjusted acceleration torque value than that shown in FIG. 4 (response filter 28 adjusts the response time in response to the signal RESP_MODIFIER) in the event the signals DRIVER_COND and DRIVER_MODE indicate such a condition is needed.

Figure 5:
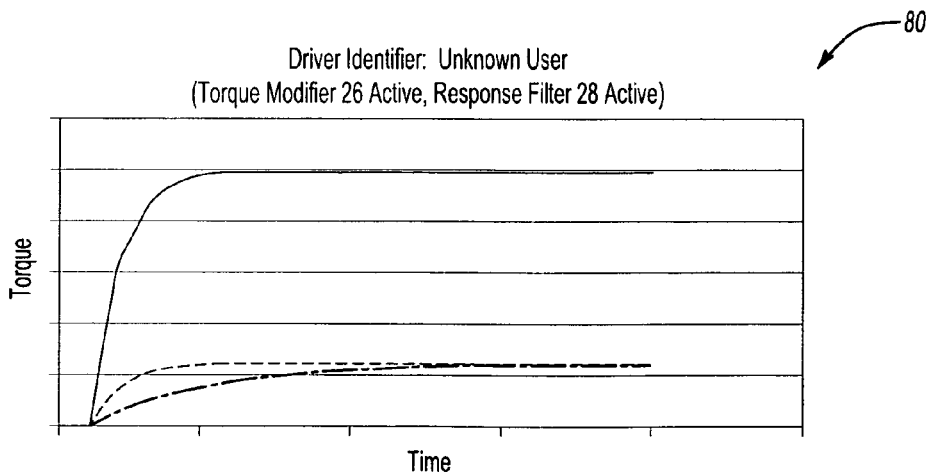
FIG. 5 is a plot illustrating a desired amount accelerator torque, an adjusted amount of accelerator torque and adjusted performance response based on the driver status.

FIG. 5 depicts a plot 80 illustrating a desired amount accelerator torque (e.g., as indicated by the signal ACCEL_TQ_DES), the adjusted accelerator torque (as indicated on the signal MOD_ACCEL_TQ_DES), and the performance response while achieving the adjusted torque value (as indicated on the signal FINAL_MOD_TORQUE_RESP) based on the driver status. The driver status for the plot 80 corresponds to an unknown driver. The plot 80 illustrates that there is an accelerator torque reduction and a performance response reduction in response to determining that the driver of the vehicle is the unknown driver. The torque reduction and the performance reduction is generally greater than that shown in FIG. 4. The large torque reduction and the large performance response reduction may be associated in large part because the driver is detected to be an unknown driver. The values of the signal DRIVER_COND and DRIVER_MODE may not play as a large a role in determining the signals TQ_MODIFIER and RESP_MODIFIER since the driver status indicates that the status of the driver is an unknown driver.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A device for controlling an amount of torque generated by a powertrain in a vehicle, the device comprising:
a controller configured to:
receive a driver status signal indicative of the status of the driver, a driver condition signal indicative of the driving conditions of the vehicle, and a driver mode signal indicative of the driving mode of the vehicle; and
control the powertrain to adjust the amount of torque that is generated based on the driver status signal, the driver condition signal, and the driver mode signal;
wherein the driver status signal corresponds to one of a master driver, a power driver, a limited driver, a limited driver with assistance needs, a severely limited driver, and an unknown driver.

2. The device of claim 1 wherein the controller is further configured to receive a desired torque request signal indicative of the amount of torque requested by the driver independent of driver status.

3. The device of claim 2 wherein the controller is further associated with a first torque modifier signal and to modify the desired torque request signal based on the first torque modifier signal to control the powertrain to adjust the amount of torque that is generated.

4. The device of claim 3 wherein the first torque modifier signal is generated based on the driver status signal, the driver condition signal, and the driver mode signal.

5. The device of claim 1 wherein the controller is further to be associated with adjust a performance response while achieving the adjusted amount of torque based on the driver status signal, the driver condition signal, and the driver mode signal.

6. The device of claim 5 wherein the controller is further configured to receive a response modifier signal to determine the adjusted performance response.

7. The device of claim 6 wherein the response modifier signal is generated based on the driver status signal, the driver condition signal, and the driver mode signal.

8. The device of claim 1 wherein the driver condition signal corresponds to at least one of a vehicle over speed condition, vehicle speed over a posted limit, vehicle speed over a set maximum threshold, a vehicle over acceleration condition, a vehicle acceleration over a set maximum threshold, a slippery road condition and a cold weather condition.

9. The device of claim 1 wherein the driver mode signal corresponds to at least one of a soft driving mode, a normal driving mode, and an aggressive driving mode.

10. A device for controlling an amount of torque produced by a powertrain in a vehicle, the device comprising:
  a controller configured to:
    receive a driver status signal indicative of the status of the driver, a driver condition signal indicative of the driving conditions of the vehicle, and a driver mode signal indicative of the driving mode of the vehicle; and
    control the powertrain to adjust the amount of torque that is produced and to adjust a performance response for achieving the adjusted torque amount based on the driver status signal, the driver condition signal, and the driver mode signal;
    wherein the driver condition signal corresponds to at least one of a vehicle over speed condition, vehicle speed over a posted limit, vehicle speed over a set maximum threshold, a vehicle over acceleration condition, a vehicle acceleration over a set maximum threshold, a slippery road condition and a cold weather condition.

11. The device of claim 10 wherein the driver status signal corresponds to one of a master driver, a power driver, a limited driver, a limited driver with assistance needs, a severely limited driver, and an unknown driver.

12. The device of claim 10 wherein the driver mode signal corresponds to at least one of a soft driving mode, a normal driving mode, and an aggressive driving mode.

13. A method for controlling an amount of torque produced by a powertrain in a vehicle, the method comprising:
  receiving a driver status signal indicative of the status of the driver, a driver condition signal indicative of the driving conditions of the vehicle, and a driver mode signal indicative of the driving mode of the vehicle; and
  controlling the powertrain to adjust the amount of torque that is produced based on at least one of the driver status signal, the driver condition signal, and the driver mode signal;
  wherein the driver mode signal corresponds to at least one of a soft driving mode, a normal driving mode, and an aggressive driving mode.

14. The method of claim 13 further comprising controlling a performance response for achieving the adjusted torque amount based on at least one of the driver status signal, the driver condition signal, and the driver mode signal.

15. The method of claim 13 wherein the driver status signal corresponds to one of a master driver, a power driver, a limited driver, a limited driver with assistance needs, a severely limited driver, and an unknown driver.

16. The method of claim 13 wherein the driver condition signal corresponds to at least one of a vehicle over speed condition, vehicle speed over a posted limit, vehicle speed over a set maximum threshold, a vehicle over acceleration condition, a vehicle acceleration over a set maximum threshold, a slippery road condition and a cold weather condition.

* * * * *